United States Patent
Abernathy et al.

(10) Patent No.: US 8,020,072 B2
(45) Date of Patent: Sep. 13, 2011

(54) METHOD AND APPARATUS FOR CORRECTING DATA ERRORS

(75) Inventors: Christopher Michael Abernathy, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 11/552,786

(22) Filed: Oct. 25, 2006

(65) Prior Publication Data

US 2008/0109687 A1  May 8, 2008

(51) Int. Cl.
*H03M 13/00* (2006.01)
(52) U.S. Cl. .......................... 714/764; 714/704; 714/765
(58) Field of Classification Search .................. 714/764, 714/765
See application file for complete search history.

(56) References Cited

U.S. PATENT DOCUMENTS

| | | | |
|---|---|---|---|
| 5,630,055 A | 5/1997 | Bannon et al. | |
| 5,712,861 A * | 1/1998 | Inoue et al. | 714/752 |
| 6,393,549 B1 * | 5/2002 | Tran et al. | 712/204 |
| 6,625,756 B1 | 9/2003 | Grochowski et al. | |
| 6,675,315 B1 | 1/2004 | Semler et al. | |
| 6,854,051 B2 | 2/2005 | Mukherjee | |
| 6,941,489 B2 | 9/2005 | DeLano | |
| 7,058,877 B2 | 6/2006 | Tremblay et al. | |
| 2005/0108509 A1 | 5/2005 | Safford et al. | |
| 2008/0077829 A1 * | 3/2008 | Graef et al. | 714/718 |
| 2009/0055680 A1 * | 2/2009 | Honda et al. | 714/5 |
| 2010/0153810 A1 * | 6/2010 | Kamiya | 714/752 |

\* cited by examiner

*Primary Examiner* — Guy J Lamarre
(74) *Attorney, Agent, or Firm* — Yee & Associates, P.C.; Libby Z. Toub

(57) ABSTRACT

The illustrative embodiments provide a computer implemented method and an apparatus for correcting data errors. An error correction unit receives data from a register. Responsive to receiving the data from the register, the error correction unit determines whether an error is present in the data. Responsive to identifying the error in the data, the error correction unit corrects the data to form corrected data. Responsive to correcting the error in the data, the error correction unit notifies a counter in the register to update.

8 Claims, 5 Drawing Sheets

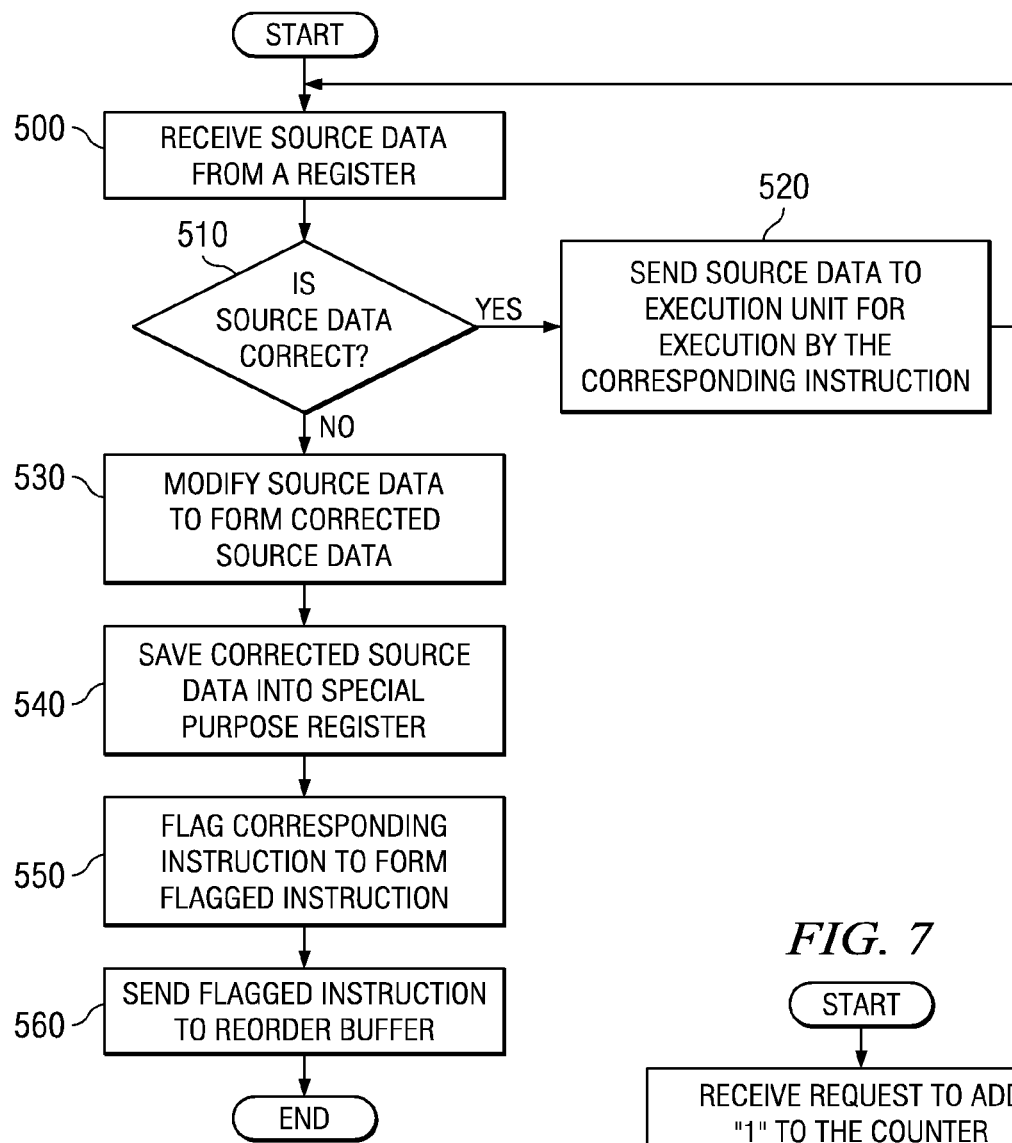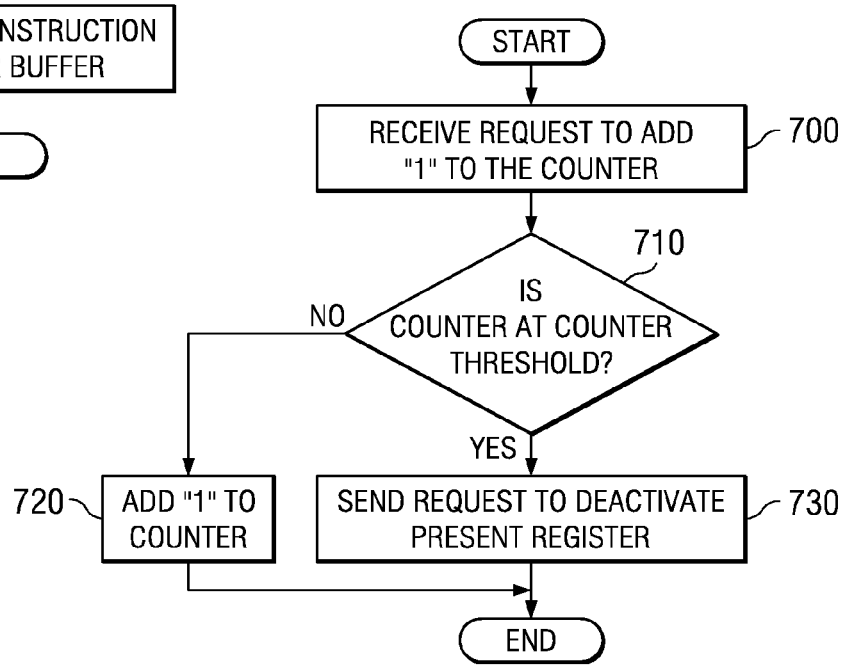

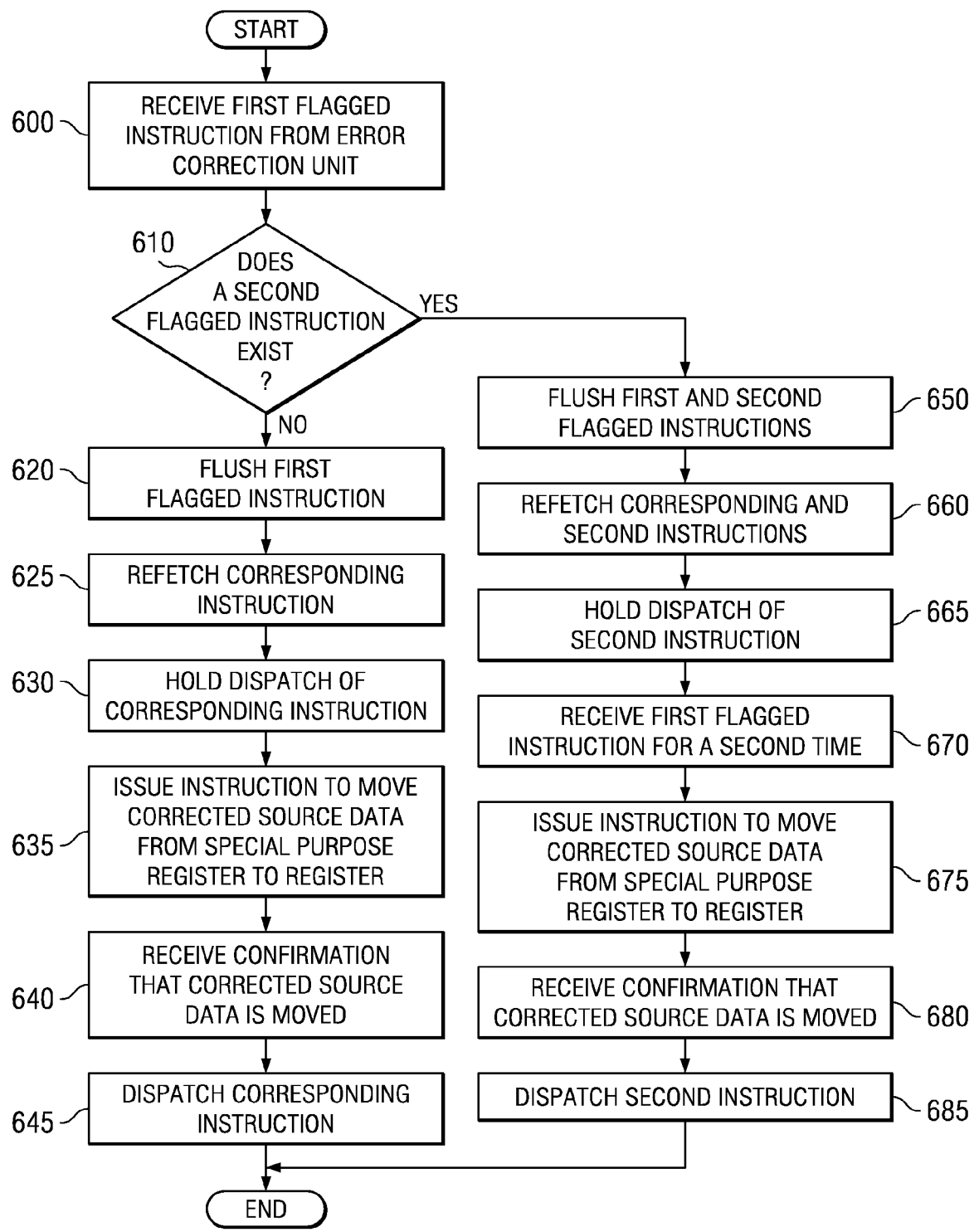

METHOD AND APPARATUS FOR CORRECTING DATA ERRORS

BACKGROUND OF THE INVENTION

1. Field of the Invention

The present invention relates generally to an improved data processing system. More specifically, the present invention relates to a method and apparatus for correcting data errors prior to execution of a series of instructions in the data processing system.

2. Description of the Related Art

A register in a data processing system often includes data errors in the data entries stored in the register. Typically, data is stored as multiple series of bits. A bit is a digit with an assigned value of either 0 or 1. Bits are combined together into a series to represent an individual data value. For example, a data value of 'A' is denoted by the binary value of '01000001,' and the data value of '4' is denoted by the binary value of '00000100.'

Errors exist in a register when a bit is the wrong binary value. In other words, an error exists when a bit is supposed to be a 0 but is showing as a 1, or when the bit is supposed to be a 1 but is showing as a 0. The bit error can be temporary or permanent. An error is temporary if the error occurs only once, such as when a data power system experiences a power surge and causes a bit to flip values. Thus, for example, a temporary error occurs when a bit flips from a 0 to 1 when an instruction executes. An error is permanent if the bit becomes stuck on a particular value. For example, a bit is supposed to have a value of 0, but the bit always shows a 1 when an instruction executes. A permanent error can exist if the register in which the bit is saved is corrupted. In such a situation, the error cannot be corrected using software.

Several solutions currently exist that allow a data processing system to correct these types of data errors. The solutions typically include the added benefit of correcting the error while minimizing the impact on processor speeds. One such solution detects data errors in the source data in parallel with executing an instruction on the source data.

Source data is data used to execute an instruction. Target data is the data resulting from the execution of the instruction. Source data and target data are stored in a register file, which is a database of information. A register file is made up of a number of registers or entries. An instruction draws source data from a register file and writes target data to the register file. In a register file, the source data and target data are each saved in a particular location in the register file, also known as an address in the register file.

In the currently used solutions, the target data is prevented from saving in the register file if an error is detected in the source data. Instead, if an error is detected in the source data, the source data is corrected and written back to the register file at the original address for the source data instead of at the address for the target data. The instruction that used the incorrect source is flushed, and the instruction is re-executed using the corrected source data. Once the process of correcting, flushing, and re-executing the instruction is completed, the target data is written into the register file.

The currently used solutions, however, have a number of drawbacks. First, the speed with which target data is written into a register file is reduced in order to accommodate the error correction process. Instead of receiving target data from a single source, the described solution has target data that originates from the normal execution path and from an error correction path. As a result, in order to accommodate both paths, the process for writing to the register file is slowed down. Ultimately, the reduced speed with which target data is written to the register file also affects the overall speed of executing the entire process. Additionally, extra bypass stages may be required to accommodate the execution of the error correction process. The extra bypass stages introduce additional physical wires and complexity into the processor.

Furthermore, the currently used solutions only resolve temporary, not permanent, bit errors. If a register is corrupted, the register will not allow corrected data to be written correctly in the register. The register will only allow data that has an error to be written into the register. Therefore, even if the source data is corrected again in the current solution, incorrect data will be written into the register file because the register file will only allow incorrect data to be written.

Moreover, these currently used solutions do not allow for the simultaneous correction of errors in multiple source data because all processes are managed by a single error correction process. In other words, each time an error is identified in the source data, the error correction process can only execute for the source data with the identified error. If other source data also have errors, the error correction process cannot process the other source data until the processor completes the error correction process for the first set of data. As a result, the completion of the overall process is delayed until all errors in all the source data are identified and fixed.

In addition, the currently used solution only addresses errors in data where the data also includes an error correction mechanism, such as error correcting code. Typically, data errors are identified in two ways: (1) using a scheme that only identifies the existence of an error, as in a parity bit scheme, or (2) using a scheme that both identifies and modifies the data so that the error is corrected, as in an error-correction code (ECC) scheme. The currently used solutions only address situations that both identify and modify the data and do not address data errors that are only identified in the data.

SUMMARY OF THE INVENTION

The illustrative embodiments provide a computer implemented method and an apparatus for correcting data errors. An error correction unit receives data from a register. Responsive to receiving the data from the register, the error correction unit determines whether an error is present in the data. Responsive to identifying the error in the data, the error correction unit corrects the error in the data to form corrected data. The corrected data is stored in a special purpose register. The corrected data is then moved from the special purpose register to the first register. The corresponding instruction then executes using the corrected data in the first register. The error correction unit also notifies a counter in the first register to update.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart illustrating a role of the error correction unit in the process of correcting data errors, in accordance with an illustrative embodiment;

FIG. 6 is a flowchart illustrating a role of the reorder buffer in the process of correcting data errors, in accordance with an illustrative embodiment;

FIG. 7 is a flowchart illustrating the role of the counter in the process of correcting data errors, in accordance with an illustrative embodiment;

DETAILED DESCRIPTION OF THE PREFERRED EMBODIMENT

Figure 1:
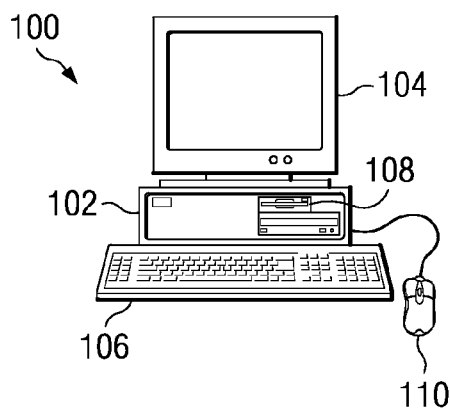
FIG. 1 illustrates a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of system software residing in computer readable media in operation within computer 100.

Figure 2:
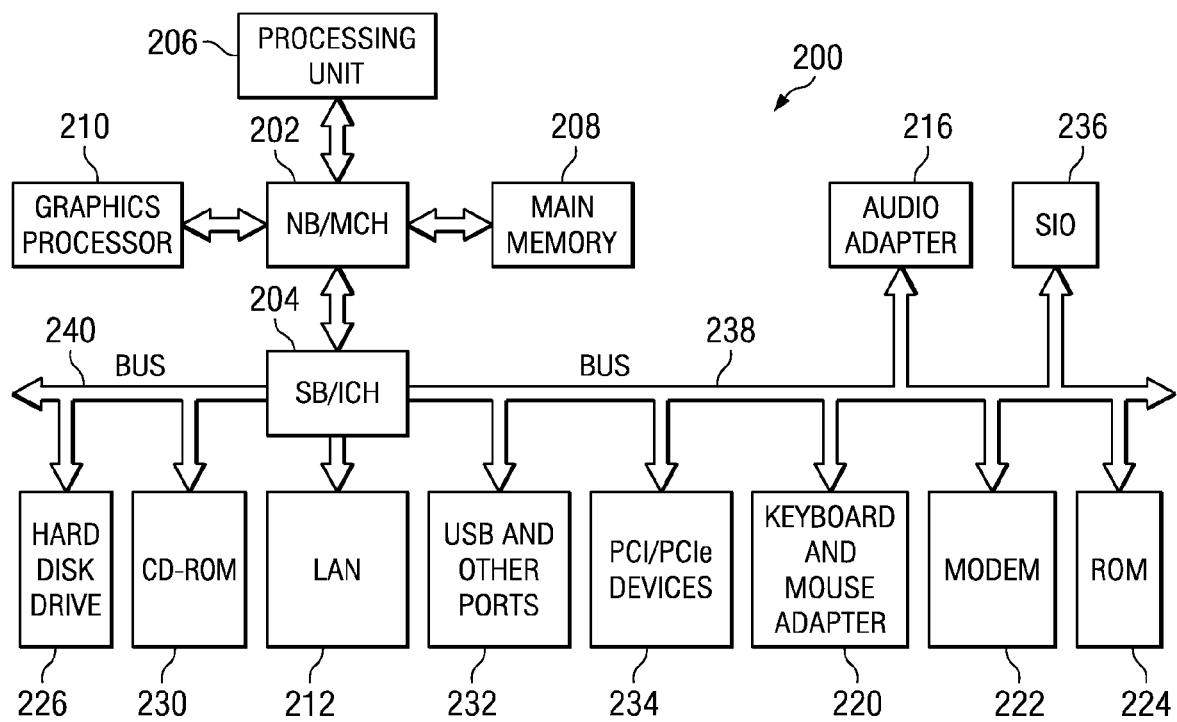
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, and universal serial bus (USB) and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP® . (Microsoft® and Windows XP® are trademarks of Microsoft Corporation in the United States, other countries, or both.) An object oriented programming system, such as the Java™ programming system, may run in conjunction with the operating system and provides calls to the operating system from Java™ programs or applications executing on data processing system 200. (Java™ and all Java-based trademarks are trademarks of Sun Microsystems, Inc. in the United States, other countries, or both.)

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or memory in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method and an apparatus for correcting data errors. An error correction unit receives data from a register. In response to receiving the data from the register, the error correction unit determines whether an error is present in the data. In response to identifying the error in the data, the error correction unit corrects the data to form corrected data. In response to correcting the data, the error correction unit notifies a counter in the register to update.

In one embodiment, the data is source data, the register is a first register, and the corrected source data is first corrected source data. The error correction unit saves the first corrected source data in a special purpose register. The error correction unit also flags a corresponding instruction to form a first flagged instruction. The corresponding instruction corresponds to the source data. The error correction unit sends the first flagged instruction to a reorder buffer. The reorder buffer then flushes the first flagged instruction and refetches the corresponding instruction. The reorder buffer then holds the corresponding instruction from dispatching until the first corrected source data is moved from the special purpose register to the first register. Once the corrected source data is moved, the reorder buffer dispatches the corresponding instruction for execution using the first corrected source data.

When the execution unit sends the flagged instruction to the reorder buffer, the reorder buffer also identifies whether a second flagged instruction exists. The second flagged instruction is an instruction that subsequently follows the first flagged instruction in the series of instructions. The second flagged instruction also saves second corrected source data into the special purpose register prior to the first corrected source data being moved from the special purpose register to the first register. If a second flagged instruction is identified by the reorder buffer, the reorder buffer flushes the first and second flagged instructions.

The first and second flagged instructions are then refetched. The refetched first flagged instruction is essentially the corresponding instruction, which is the instruction prior to the error correction unit flagging the instruction. The refetched second instruction is the second instruction prior to the error correction unit flagging the second instruction. The corresponding instruction is then re-executed using the source data, while the dispatch of the refetched second instruction is held. During the re-execution of the corresponding instruction, the process for correcting data errors repeats. In other words, the error correction unit receives source data and re-executes the corresponding instruction. If the data does not include an error, then the corresponding instruction executes normally using the source data. If, however, an error is identified in the data, error correction unit corrects the source data and saves the corrected source data in the special purpose register. The corrected source data is then moved from the special purpose register to the first register. The corresponding instruction is then flagged for a second time and sent to the reorder buffer. The reorder buffer then releases the hold and dispatches the refetched second instruction.

The first or second corrected source data can be moved into either the first register or a second register. The corrected source data is moved to a second register if a counter threshold in the first register is reached. If the first or second corrected source data is moved to the second register, all subsequent instructions in the series of instructions are routed to the second register.

In another embodiment, the data is target data. In order to correct the target data, the error correction unit flushes and refetches the corresponding instruction. The corresponding instruction then re-executes against source data to create the target data again. The source data is the data that was used to initially execute the corresponding instruction. The target data is then saved into either the first register or a second register. If the target data is saved into a second register because the first register reached a counter threshold, then all subsequent instructions in the series of instructions are routed to the second register.

Figure 3:
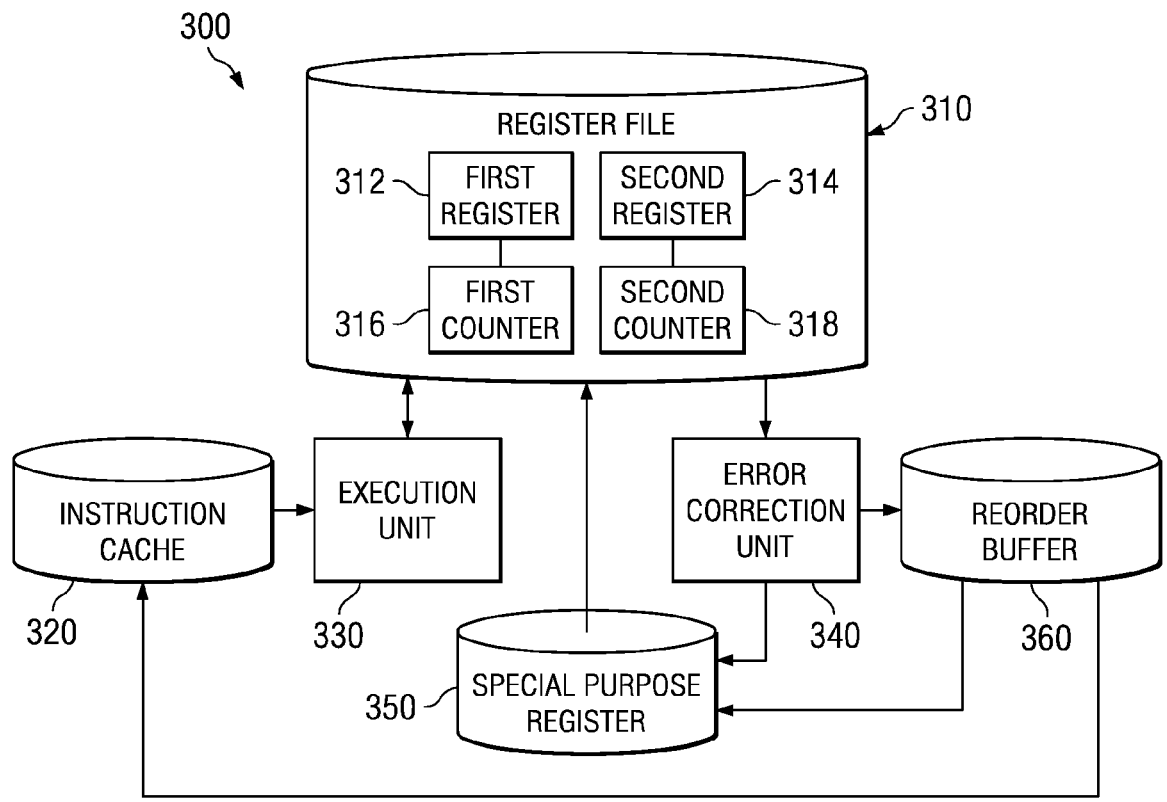
FIG. 3 illustrates a processor unit that utilizes an error correcting mechanism capable of identifying and correcting errors in source data, in accordance with an illustrative embodiment.

FIG. 3 illustrates a processor unit that utilizes an error correcting mechanism capable of identifying and correcting errors in source data, in accordance with an illustrative embodiment. Processor unit 300 is a more detailed example of processor unit 206 of FIG. 2 and executes in a data processing system, such as data processing system 100 of FIG. 1 and data processing system 200 of FIG. 2. In this illustrative example, processor unit 300 includes register file 310, instruction cache 320, execution unit 330, error correction unit 340, special purpose register 350, and reorder buffer 360. Processor unit 300 may also include other components that are not shown. The depicted components are presented for purposes of describing the different embodiments.

Register file 310 is a database and includes first register 312, second register 314, first counter 316, and second counter 318. First register 312 and second register 314 are files within register file 310 that store data. First register 312 and second register 314 can store data in any format, including but not limited to a table, a flat file, an Extensible Markup Language (XML) file, a relational database management system, or any combination thereof. In the illustrative embodiment, first register 312 and second register 314 store data in a table.

In the illustrative embodiment, first register 312 and second register 314 can store two types of data: source data and target data. Source data is information or data used at the beginning of an instruction. Target data is the resulting information or data after an instruction is completed. An instruction is a single operation performed within a processor, such as processor unit 206 of FIG. 2, of a data processing system, such as processor unit 300. Thus, for example, in the illustrative embodiment, processor unit 300 includes an instruction to "add" two values found in two separate columns in register file 310. If, for example, the two values in register file 310 are "1" and "2", then the instruction will perform the operation of "1+2", with the result of "3" after the instruction is completed. In the illustrative example, "1" and "2" are the source data, and "3" is the target data. The instruction is the operation "1+2" in these examples.

In a series of instructions, each instruction in the series has corresponding source and target data. In one embodiment, the source and target data for each subsequent instruction are not related. In another embodiment, the target data generated from a previous instruction is the source data for a subsequent instruction. Thus, for example, consider a series of instructions in processor unit 300 that includes a first instruction and a second instruction. The second instruction is to be performed in succession following the first instruction. In the illustrative example, the first instruction is to "add" two values found in the first two columns of register file 310. The second instruction is to "multiply" the result of the first instruction by a third value found in a third column in register file 310. In the illustrative example, the values in the first two columns are "1" and "2" and the value in the third column is "4". Thus, the first instruction will perform the operation of "1+2" with the result of "3" in this example. The second instruction will use the result of the first operation to perform the second instruction. Thus, the second instruction will perform the operation of "3*4", with the result of "12". Therefore, as in the previous illustrative example, the source data for the first instruction is "1" and "2", the target data is "3", and the first instruction is "1+2". For the second instruction, the source data is "3" and "4", the target data is "12", and the second instruction is "3*4". Thus, in a process with a series of instructions, the target data "3" for the first instruction becomes the source data "3" for the second instruction. If a third instruction follows the second instruction, the target data "12" for the second instruction will become the source data for the third instruction.

First counter 316 and second counter 318 connect to first register 312 and second register 314, respectively. First counter 316 and second counter 318 are structures similar to first register 312 and second register 314. Thus, in the illustrative embodiment, first counter 316 and second counter 318 are tables. First counter 316 and second counter 318 track or keep count of the number of entries stored in first register 312 and second register 314, respectively. Specifically, in the illustrative embodiment, first counter 316 and second counter 318 track the number of entries that include an error.

Instruction cache 320 connects to execution unit 330 and reorder buffer 360. Instruction cache 320 is a storage device that stores an instruction or series of instructions to be executed by execution unit 330. Typically, instruction cache 320 can receive instructions from any part of a data processing system, including but not limited to a main memory, such as main memory 208 of FIG. 2.

Execution unit 330 connects to register file 310 and instruction cache 320. Execution unit 330 carries out a single instruction or a series of instructions. In the illustrative embodiment, execution unit 330 executes the instruction or series of instructions stored in instruction cache 320 against the data stored in register file 310.

Error correction unit 340 connects to register file 310, special purpose register 350, and reorder buffer 360. Error correction unit 340 determines the presence of and corrects any error in the data stored in register file 310. Error correction unit 340 can correct source data or target data. In the illustrative embodiment, error correction unit 340 corrects source data to form corrected source data.

In the illustrative embodiment, data in register file 310 includes an error identification mechanism, such as an error-correction code (ECC) or a parity bit. The error identification mechanism can either (1) both identify and modify the data error so that the error is corrected, as in an error-correction code (ECC) scheme, or (2) only identify the existence of an error, as in a parity bit scheme. In the illustrative embodiment, the data in register file 310 include an error identification mechanism that both identifies and corrects the data error. Thus, in the illustrative embodiment, error correction unit 340 utilizes the error identification mechanism to identify the presence of an error in the data and then subsequently to correct the error.

Each time error correction unit 340 identifies the presence of an error in the data of register file 310, error correction unit 340 notifies both register file 310 and reorder buffer 360. Depending on which register, either first register 312 or second register 314, the corrected data is to be saved into, first counter 316 or second counter 318 updates.

In the illustrative embodiment, first counter 316 and second counter 318 can include a counter threshold. The counter threshold is the maximum number of error-filled data entries a single register file can store before the register file is disabled. The counter threshold can be determined by a user of or an administrator for data processing system 300. The counter threshold can also be a default setting preset within data processing system 300. In the illustrative embodiment, first counter 316 and second counter 318 include a counter threshold set by the user.

Special purpose register 350 connects to register file 310, error correction unit 340, and reorder buffer 360. Special purpose register 350 is a memory unit designated for a particular purpose. In the illustrative embodiment, special purpose register 350 is a database within the main memory of processor unit 300 designated for the purpose of storing corrected source data. Special purpose register 350 stores corrected source data in any format, including but not limited to a table, a flat file, an Extensible Markup Language (XML) file, a relational database management system, or any combination thereof. Special purpose register 350 receives the corrected source data from error correction unit 340. In the illustrative embodiment, in response to the special purpose register 350 receiving the corrected source data, reorder buffer 360 issues a command to move the corrected source data from special purpose register 350 to register file 310. The corrected source data is then saved into register file 310 for use by an instruction in execution unit 330.

In the illustrative embodiment, the corrected source data can be saved into either first register 312 or second register 314. Typically, the register from which the source data originated is the register to which special purpose register 350 will move the corrected source data. Thus, the specification of which register to move the corrected data into is a default setting within processor unit 300. However, the user of or the administrator for processor unit 300 can also predetermine which register, first register 312 or second register 314, into which to save the corrected source data.

If a counter threshold for a register is reached, the register is deactivated and all subsequent instructions in a series of instructions are re-routed to the other register. Thus, for example, when first register 312 is deactivated, first register 312 is considered "dead" and first register 312 is never allocated for an instruction to use again in the future. A "dead" register is essentially a corrupted register or a register that generates a permanent bit error. Therefore, by assigning a "dead" state to the register, permanent errors are eliminated because the "dead" register is never allocated for use again.

Thus, when determining where to save the corrected source data, in an alternative embodiment, the counter threshold can determine into which register to save the corrected source data. For example, in the illustrative embodiment, if the counter threshold in first counter 316 for first register 312 is reached, then the corrected source data can be saved into second register 314. Likewise, if the counter threshold in second counter 316 for second register 314 is reached, then the corrected source data can be saved into first register 312 or another register (not shown).

Reorder buffer 360 connects to error correction unit 340, special purpose register 350, and instruction cache 320. Reorder buffer 360 is used to identify and manage the dispatch of an instruction that will execute against source data that has an error. In essence, reorder buffer 360 is used to hold or suspend an instruction, thereby giving error correction unit 340 time to correct the errors found in the source data prior to the instruction executing against the source data. In a series of instructions, reorder buffer 360 is also used to identify from which instruction a series of instructions should begin executing again.

Reorder buffer 360 is a database that lists all the instructions stored in instruction cache 320. Reorder buffer 360 can store data in any format, including but not limited to a table, a flat file, an Extensible Markup Language (XML) file, a relational database management system, or any combination thereof. In the illustrative embodiment, reorder buffer 360 stores data in a table.

In the illustrative embodiment, reorder buffer 360 lists all the instructions assigned to execute against a source data with an error. Each instruction is identified by an individual tag. When an instruction corresponds to a source data with an error, error correction unit 340 reads the individual tag for the instruction and flags the instruction. The flagging of the instruction forms a flagged instruction. The flagged instruction as well as the corresponding tag for the flagged instruction is added as an entry in reorder buffer 360.

Once an instruction is flagged and entered into reorder buffer 360, reorder buffer 360 then locates the actual instruction in instruction cache 320 by comparing the tag for the flagged instruction with the tags for the instructions in instruction cache 320. Once the correct instruction is located in instruction cache 320, reorder buffer 360 flushes the instruction and refetches the instruction from instruction cache 320. Reorder buffer 360 flushes by clearing the entire pipeline of instructions, including any instructions that execute subsequent to the flagged instruction. The entire pipeline of instructions is then refetched and re-executed using corrected source data.

In certain embodiments, reorder buffer 360 will have a second or a number of other flagged instructions that execute subsequent to the first flagged instruction. Therefore, in other words, an instruction subsequent to the first flagged instruction also contains an error in the respective source data. As a result, the second or other flagged instructions are also stored as an entry in reorder buffer 360.

In the illustrative embodiment, special purpose register 350 only stores a single corrected source data entry. Additionally, in the illustrative embodiment, a series of instructions share one special purpose register, such as special purpose register 350. Therefore, when a series of instructions is executed, each subsequent instruction to the first flagged instruction writes corrected source data to special purpose register 350. Thus, any previously saved source data is written over by the corrected source data for a subsequent instruction.

In certain circumstances, a second or third flagged instruction, which are instructions that execute subsequently to a first flagged instruction, sometimes execute before the source data for the first flagged instruction is corrected. Consequently, the corrected source data in special purpose register 350 is no longer the corrected source data for the first flagged instruction. Instead, the corrected source data is the corrected source data for the second or even the third flagged instruction. The corrected source data for the first flagged instruction no longer exists and is written over by the corrected source data for the second or third flagged instruction.

Therefore, in order to ensure that the appropriate corrected source data is executed against the corresponding flagged instruction, reorder buffer 360 re-executes the entire series of instructions. Thus, reorder buffer 360 flushes and refetches the entire series of instructions that is to be re-executed. The refetched series of instructions is the same series of instructions that was executing prior to error correction unit 340 flagging the instruction. Thus, the refetched first flagged instruction is the corresponding instruction prior to error correction unit 340 flagging the corresponding instruction. Likewise, a refetched second flagged instruction is the second instruction prior to error correction unit 340 flagging the second instruction. In the illustrative embodiment, the refetched second flagged instruction forms a refetched second instruction. After the entire series is flushed, reorder buffer 360 refetches the entire series of instructions and serializes the flagged instructions. To serialize means that reorder buffer 360 holds dispatch of any subsequent flagged instruction until the corresponding instruction re-executes.

When the corresponding instruction re-executes, the process for correcting data errors is repeated. In other words, error correction unit 340 receives source data from register file 310 and re-executes the corresponding instruction. If the source data does not include an error, then the corresponding instruction executes normally using the source data. If, however, an error is identified in the data, error correction unit 340 corrects the source data and saves the corrected source data in special purpose register 350. The corrected source data is then moved from special purpose register 350 to register file 310. The corresponding instruction is then flagged for a second time and sent to reorder buffer 360. Reorder buffer 360 then releases the hold and dispatches the refetched second instruction.

The illustrative embodiment is not limited to the illustrated example. For example, processor unit 300 may include more or fewer registers for storing data. Additionally, register file 310 may include more or fewer register files. Furthermore, first register 312 and second register 314 may also be a single file where one register is a subset of the other register. Thus, first register 312 may include second register 314 and vice-versa. Moreover, register file 310 may be a subset of another register file. In addition, register file 310 may or may not include first counter 316 and second counter 318. Moreover, processor unit 300 may include more or fewer special purpose registers.

Figure 4:
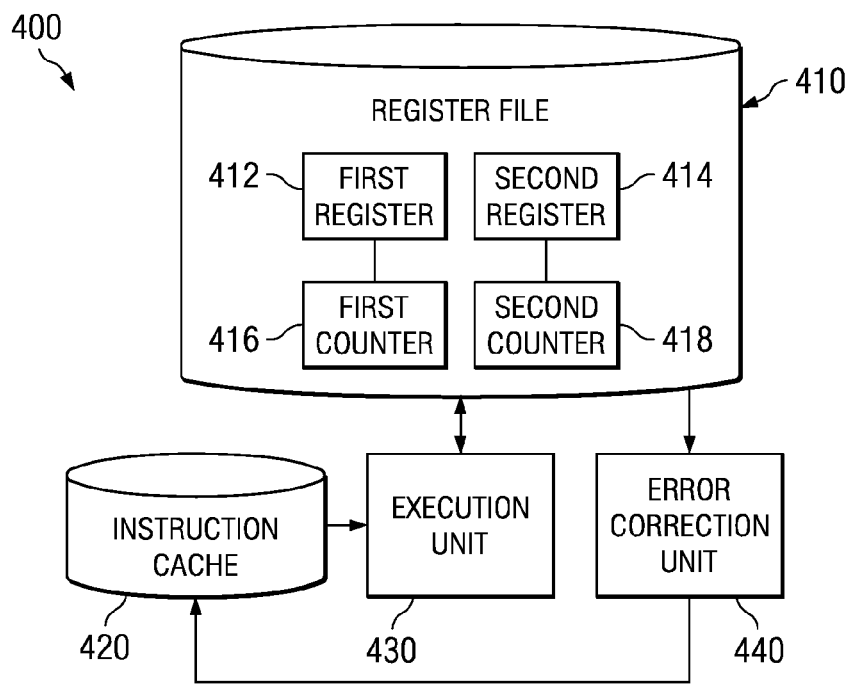
FIG. 4 illustrates a processor unit that utilizes an error correcting mechanism that identifies the existence of an error in target data, in accordance with an illustrative embodiment.

FIG. 4 illustrates a processor unit that utilizes an error correcting mechanism that identifies the existence of an error in target data, in accordance with an illustrative embodiment. Processor unit 400 is similar to processor unit 206 of FIG. 2 and executes in a data processing system, similar to data processing system 100 of FIG. 1 and data processing system 200 of FIG. 2. Processor unit 400 includes register file 410, instruction cache 420, execution unit 430, and error correction unit 440.

Register file 410 is a database similar to register file 310 of FIG. 3. Register file 410 includes first register 412, second register 414, first counter 416, and second counter 418. In the illustrative embodiment, first register 412 and second register 414 are tables and store both source data and target data.

First counter 416 and second counter 418 connect to first register 412 and second register 414, respectively. First counter 416 and second counter 418 are structured similarly to first register 412 and second register 414. Thus, in the illustrative embodiment, first counter 416 and second counter 418 are tables. In the illustrative embodiment, first counter 416 and second counter 418 track the number of entries in first register file 412 and second register file 414, respectively, that include an error.

Instruction cache 420 connects to execution unit 430 and error correction unit 440. Instruction cache 420 is similar to instruction cache 320 of FIG. 3 and stores an instruction or series of instructions to be executed by processor unit 400. In the illustrative embodiment, instruction cache 420 stores the instructions to be executed against the data stored in register file 410.

Execution unit 430 connects to both register file 410 and instruction cache 420. Execution unit 430 is similar to execution unit 330 of FIG. 3. Execution unit 430 carries out a single instruction or a series of instructions. In the illustrative embodiment, execution unit 430 executes the instruction or series of instructions stored in instruction cache 420 against the data stored in register file 410.

Error correction unit 440 connects to register file 410 and instruction cache 420. Error correction unit 440 determines the presence of any error in the target data stored in register file 410. The data in register file 410 includes an error identification mechanism, such as a parity bit. The error identification mechanism only identifies the existence of an error. The error identification mechanism does not include a mechanism to actually correct the data error. Typically, the error identification mechanism may not even identify the location of the error in the data. Therefore, in use, after error correction unit 440 identifies the presence of an error in the target data, error correction unit 440 corrects the error in the target data by flushing the instruction that processed the target data that included the error. Error correction unit 440 then refetches the same instruction by requesting instruction cache 420 to send the same instruction to execution unit 430. Execution unit 430 then re-executes the same instruction using the corresponding source data. By re-executing the same instruction using the source data, the resulting target data is corrected.

Each time error correction unit 440 identifies the presence of an error in the target data of register file 410, error correction unit 440 notifies register file 410. When target data with an error is saved into either first register 412 or second register 414, counter 416 updates.

In the illustrative embodiment, first counter 416 and second counter 418 each include a counter threshold. Similar to first counter 316 and second counter 318 of FIG. 3, first counter 416 and second counter 418 include a counter threshold set by the user. In the illustrative embodiment, if the counter threshold is reached in first counter 416, then first register 412 is deactivated and considered "dead", the target data is saved into second register 414, and all subsequent instructions are re-routed to second register 414. Similarly, if the counter threshold is reached in second counter 418, then second register 414 is deactivated and considered "dead", the target data is saved into first register 412 or another register (not shown), and all subsequent instructions are re-routed to first register 412 or the other register (not shown).

The illustrative embodiment is not limited to the illustrated example. For example, processor unit 400 may include more or fewer registers for storing data. Additionally, register file 410 may include more or fewer register files. Furthermore, first register 412 and second register 414 may also be a single file where one register is a subset of the other register. Thus, first register 412 could include second register 414 and vice-versa. Moreover, register file 410 may be a subset of another register file. In addition, register file 410 may or may not include first counter 416 or second counter 418.

FIG. 5 is a flowchart illustrating a role of the error correction unit in the process of correcting data errors, in accordance with an illustrative embodiment. The following process is exemplary only and the order of each step may be interchanged without deviating from the scope of the invention. The process is executed within an error correction unit similar to error correction unit 340 of FIG. 3.

The process begins with the error correction unit receiving source data from a register (step 500). The error correction unit then determines whether the source data is correct (step 510). If the source data is correct ("yes" output to step 510), then the error correction unit sends the source data to an execution unit for execution by the corresponding instruction (step 520). The process then repeats and returns to step 500.

If the source data is not correct ("no" output to step 510), then the execution unit utilizes a mechanism in the source data to modify the source data and form corrected source data (step 530). The execution unit then saves the corrected source data into a special purpose register (step 540). The execution unit then flags the corresponding instruction to form a flagged instruction (step 550). The execution unit then sends the flagged instruction to a reorder buffer (step 560), with the process terminating thereafter.

FIG. 6 is a flowchart illustrating a role of the reorder buffer in the process of correcting data errors, in accordance with an illustrative embodiment. The following process is exemplary only and the order of the steps may be interchanged without deviating from the scope of the invention. The process is executed within a reorder buffer similar to reorder buffer 360 of FIG. 3.

The process begins with the reorder buffer receiving a first flagged instruction from an error correction unit (step 600). The reorder buffer then determines whether a second flagged instruction exists (step 610). The second flagged instruction is an instruction that subsequently follows the first flagged instruction in the series of instructions. The second flagged instruction also saves second corrected source data into the special purpose register before the corrected source data from the first flagged instruction is moved from the special purpose register to a register. If a second flagged instruction does not exist ("no" output to step 610), the first flagged instruction is flushed (step 620). The reorder buffer then refetches the corresponding instruction (step 625). The corresponding instruction is the first flagged instruction prior to the error correction unit flagging the first flagged instruction. The reorder buffer then holds dispatch of the corresponding instruction (step 630). The reorder buffer then issues an instruction to move the corrected source data from the special purpose register to a register (step 635). The corrected source data can move to either a first or a second register. The first register is the register in which the source data first originated. The second register is another register in the data processing system. Once the reorder buffer receives confirmation that the corrected source data is moved (step 640), the reorder buffer dispatches the corresponding instruction (step 645), with the process terminating thereafter.

Returning to step 610, if a second flagged instruction does exist ("yes" output to step 610), then the reorder buffer flushes the first and second flagged instructions (step 650). The reorder buffer then refetches the corresponding instruction and the second instruction (step 660). The corresponding instruction is the first flagged instruction prior to the error correction unit flagging the first flagged instruction. The second instruction is the second flagged instruction prior to the error correction unit flagging the second flagged instruction. The reorder buffer then holds dispatch of the second instruction (step 665). The reorder buffer then receives the first flagged instruction for a second time (step 670). The first flagged instruction is received for a second time if an error is identified in the source data during the re-execution process of the corresponding instruction. If no error is identified, then the process continues normally. But, if an error is identified, then the error correction unit identifies and corrects the error. Additionally, the error correction unit flags the corresponding instruction for a second time and sends the first flagged instruction to the reorder buffer for a second time.

Returning to step 670, the reorder buffer issues an instruction to move the corrected source data from the special purpose register to a register (step 675). The reorder buffer then receives confirmation that the corrected source data is moved (step 680). The reorder buffer then dispatches the refetched second instruction (step 685), with the process terminating thereafter.

FIG. 7 is a flowchart illustrating the role of the counter in the process of correcting data errors, in accordance with an illustrative embodiment. The following process is exemplary only and the order of the steps may be interchanged without deviating from the scope of the invention. The process is executed within a counter similar to counter 316 of FIG. 3 and counter 416 of FIG. 4.

The process begins with the counter receiving a request to add "1" to the counter (step 700). The counter then determines whether a counter threshold has been reached (step 710). If a counter threshold is not reached ("no" output to step 710), then "1" is added to the counter (step 720), with the process terminating thereafter. Returning to step 710, if the counter threshold is reached ("yes" output to step 710), the counter then sends a request to deactivate the present register (step 730). The execution unit then directs all subsequent instructions to another register. The process terminates thereafter.

Figure 8:
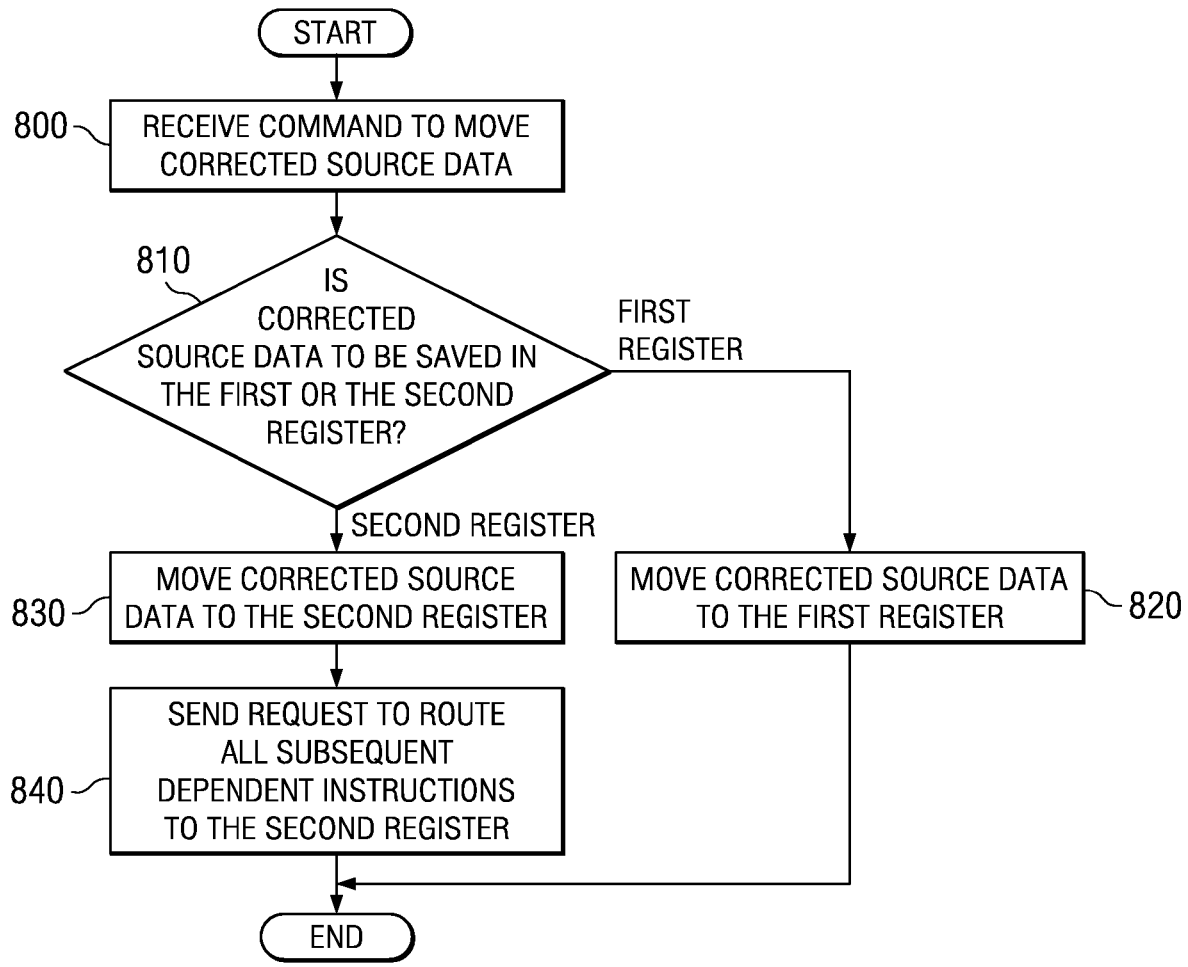
FIG. 8 is a flowchart illustrating a role of the special purpose register in the process of correcting data errors, in accordance with an illustrative embodiment.

FIG. 8 is a flowchart illustrating a role of the special purpose register in the process of correcting data errors, in accordance with an illustrative embodiment. The following process is exemplary only and the order of the steps may be interchanged without deviating from the scope of the invention. The process is executed within a special purpose register similar to special purpose register 350 of FIG. 3.

The process begins with the special purpose register receiving a command to move corrected source data (step 800). The special purpose register then determines whether the corrected source data is to be saved in the first or the second register (step 810). If the special purpose register determines that the corrected source data should be saved in the first register ("first register" output to step 810), then the special purpose register moves the corrected source data to the first register (step 820), with the process terminating thereafter.

Returning to step 810, if the special purpose register determines that the corrected source data should be saved in the second register ("second register" output to step 810), then the special purpose register moves the corrected source data to the second register (step 830). The special purpose register then sends a request to route all subsequent dependent instructions to the second register (step 840). Dependent instructions are instructions that use the target data generated as a result of an instruction using the corrected source data. The process terminates thereafter.

Figure 9:
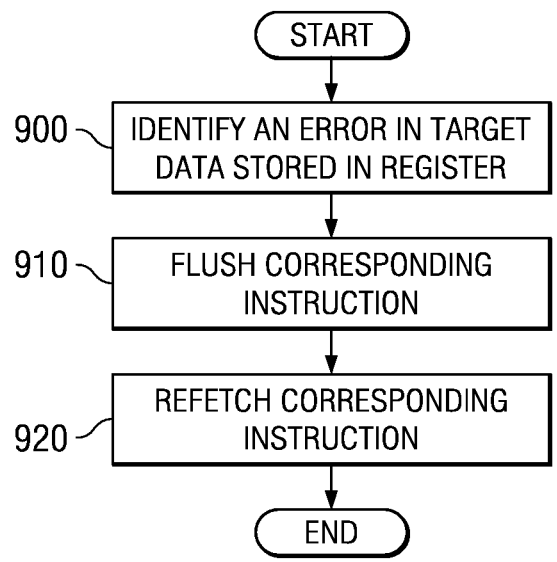
FIG. 9 is a flowchart of processes within an error correction unit that identifies errors in target data, in accordance with an illustrative embodiment.

FIG. 9 is a flowchart of processes within an error correction unit that identifies errors in target data, in accordance with an illustrative embodiment. The following process is exemplary only and the order of the steps may be interchanged without deviating from the scope of the invention. The process is executed within an error correction unit similar to error correction unit 440 of FIG. 4.

The process begins with the error correction unit identifying an error in target data stored in a register (step 900). The error correction unit then flushes the corresponding instruction (step 910). The corresponding instruction is the instruction that generated the target data that includes an error. The error correction unit then refetches the corresponding instruction (step 920). The corresponding instruction is then re-executed using the original source data. The original source data is the source data that corresponds to the target data that includes an error. The process terminates thereafter.

The illustrative embodiments provide a computer implemented method and an apparatus for correcting data errors. An error correction unit receives data from a register. In response to receiving the data from the register, the error correction unit determines whether an error is present in the data. In response to identifying the error in the data, the error correction unit corrects the data to form corrected data. In response to correcting the data, the error correction unit notifies a counter in the register to update.

In one embodiment, the data is source data, the register is a first register, and the corrected source data is first corrected source data. The error correction unit saves the first corrected source data in a special purpose register. The error correction unit also flags the corresponding instruction to form a first flagged instruction. The error correction unit sends the first flagged instruction to a reorder buffer. The reorder buffer then flushes the first flagged instruction and refetches the corresponding instruction. The reorder buffer then holds the corresponding instruction from dispatching until the first corrected source data is moved from the special purpose register to the first register. Once the corrected source data is moved, the reorder buffer dispatches the corresponding instruction for execution using the first corrected source data.

When the execution unit sends the flagged instruction to the reorder buffer, the reorder buffer also identifies whether a second flagged instruction exists. The second flagged instruction is an instruction that subsequently follows the first flagged instruction in the series of instructions. The second flagged instruction also saves second corrected source data into the special purpose register prior to the first corrected source data being moved from the special purpose register to the first register. If a second flagged instruction is identified by the reorder buffer, the reorder buffer flushes the first and second flagged instructions.

The first and second flagged instructions are then refetched. The refetched first flagged instruction is essentially the corresponding instruction, which is the instruction prior to the error correction unit flagging the instruction. The refetched second instruction is the second instruction prior to the error correction unit flagging the second instruction. The corresponding instruction is then re-executed using the source data, while the dispatch of the refetched second instruction is held. During the re-execution of the corresponding instruction, the process for correcting data errors repeats. In other words, the error correction unit receives source data and re-executes the corresponding instruction. If the data does not include an error, then the corresponding instruction executes normally using the source data. If, however, an error is identified in the data, the error correction unit corrects the source data and saves the corrected source data in the special purpose register. The corrected source data is then moved from the special purpose register to the first register. The corresponding instruction is then flagged for a second time and sent to the reorder buffer. The reorder buffer then releases the hold and dispatches the refetched second instruction.

The first or second corrected source data can be moved into either the first register or a second register. The corrected source data is moved to a second register if a counter threshold in the first register is reached. If the first or second corrected source data is moved to the second register, all subsequent instructions in the series of instructions are routed to the second register.

In another embodiment, the data is target data. In order to correct the target data, the error correction unit flushes and refetches the corresponding instruction. The corresponding instruction then re-executes against the source data to create the target data again. The source data is the data that was used to initially execute the corresponding instruction. The target data is then saved into either the first register or a second register. If the target data is saved into a second register because the first register reached a counter threshold, then all subsequent instructions in the series of instructions are routed to the second register.

The illustrative embodiments allow for the correction of data without impacting the overall speed of executing a series of instructions. Additionally, the illustrative embodiments address both temporary and permanent bit errors. Furthermore, the illustrative embodiments allow for the simultaneous correction of errors in multiple source data. Moreover, the illustrative embodiment addresses data errors regardless of whether the data includes an error correction mechanism. Thus, the illustrative embodiment addresses errors in both source and target data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in an error correction unit for correcting data errors, the method comprising:
   receiving, by the error correction unit, data from a first register;
   responsive to receiving the data from the first register, determining, by the error correction unit, whether an error is present in the data;
   responsive to identifying the error in the data, correcting, by the error correction unit, the error in the data to form corrected data;
   responsive to correcting the error in the data, notifying, by the error correction unit, a counter in the first register to update;
   responsive to reaching a counter threshold, deactivating the first register; and
   responsive to deactivating the first register, routing instructions to a second register.

2. The computer implemented method of claim 1, wherein the data is source data, and wherein the corrected data is corrected source data, and wherein the step of correcting the error in the data to form corrected data comprises:
   flagging a corresponding instruction to form a flagged instruction, wherein the corresponding instruction corresponds to the source data;
   saving the corrected source data in a special purpose register;
   sending the flagged instruction to a reorder buffer, wherein the reorder buffer flushes the flagged instruction, and wherein the reorder buffer refetches the corresponding instruction, and wherein the reorder buffer holds dispatch of the corresponding instruction until the corrected source data moves from the special purpose register to the first register; and
   responsive to moving the corrected source data from the special purpose register to the first register, notifying the reorder buffer to dispatch the corresponding instruction for execution using the corrected source data.

3. The computer implemented method of claim 2, wherein the corrected source data is first corrected source data, and wherein the flagged instruction is a first flagged instruction, and wherein the computer implemented method further comprises:
   identifying a second flagged instruction, wherein the second flagged instruction saves second corrected source data to the special purpose register prior to the first corrected source data being moved from the special purpose register to the first register;
   responsive to identifying a second flagged instruction, flushing the second flagged instruction by the reorder buffer, wherein the reorder buffer refetches the second flagged instruction to form a refetched second instruction;
   serializing the corresponding and refetched second instructions, wherein the step of serializing includes holding dispatch of the refetched second instruction until the first corrected source data moves from the special purpose register to the first register; and
   receiving the first flagged instruction for a second time.

4. The computer implemented method of claim 1, wherein the data is target data, and wherein the step of correcting the error in the data to form corrected data comprises:
   flushing a corresponding instruction;

responsive to flushing the corresponding instruction, refetching the corresponding instruction; and responsive to refetching the corresponding instruction, sending the corresponding instruction to an execution unit, wherein the execution unit re-executes the corresponding instruction using a source data, wherein the source data is data against which the corresponding instruction executed prior to an identification of the error in the target data.

5. An apparatus comprising:

a first register comprising data;

an error correction unit coupled to the register, wherein the error correction unit corrects the data to form corrected data in response to identifying an error in the data; and a counter coupled to the error correction unit, wherein the counter is notified when the error correction unit sends the corrected data to the register;

an execution unit coupled to the first register, wherein the execution unit executes a corresponding instruction using the data; and a second register to which the execution unit routes all subsequent instructions in a series of instructions from the first register in response to the first register being deactivated, and wherein the first register is deactivated when a counter threshold is reached.

6. The apparatus of claim 5, wherein the data is source data, and wherein the corrected data is corrected source data, and wherein the data processing system further comprises:

a reorder buffer coupled to the error correction unit, wherein the reorder buffer:

receives a flagged instruction from the error correction unit, and wherein the error correction unit flags the corresponding instruction when the error in the source data is identified, and wherein the flagging by the error correction unit forms the flagged instruction;

flushes the flagged instruction; and refetches the corresponding instruction; and a special purpose register coupled to the error correction unit, wherein the special purpose register stores the corrected source data, and wherein the reorder buffer holds dispatch of the corresponding instruction until the corrected source data moves from the special purpose register to the first register.

7. The apparatus of claim 6, wherein the corrected source data is first corrected source data, and wherein the flagged instruction is a first flagged instruction, and wherein the reorder buffer:

identifies a second flagged instruction, wherein the second flagged instruction saves second corrected source data to the special purpose register prior to the first corrected source data being moved from the special purpose register to the first register;

responsive to identifying a second flagged instruction, flushes the second flagged instruction, wherein the reorder buffer refetches the second flagged instruction to form a refetched second instruction;

serializes the corresponding and refetched second instructions, wherein the step of serializing includes holding dispatch of the refetched second instruction until the first corrected source data moves from the special purpose register to the first register; and receives the first flagged instruction for a second time.

8. The apparatus of claim 5, wherein the error correction unit:

flushes the corresponding instruction;

responsive to flushing the corresponding instruction, refetches the corresponding instruction; and responsive to refetching the corresponding instruction, sends the corresponding instruction to an execution unit, wherein the execution unit re-executes the corresponding instruction using a source data, wherein the source data is data against which the corresponding instruction executed prior to an identification of the error in the target data.

* * * * *